United States Patent
Dombrowski et al.

(10) Patent No.: US 6,632,032 B1
(45) Date of Patent: Oct. 14, 2003

(54) REMOTE DATA NETWORK ACCESS IN A COMMUNICATION NETWORK UTILIZING OVERHEAD CHANNELS

(75) Inventors: John J. Dombrowski, Freehold, NJ (US); Tai-Bai Kong, Hazlet, NJ (US); Wayne D. Lindholm, Englewood, CO (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/056,171

(22) Filed: Apr. 7, 1998

(51) Int. Cl.[7] .......................... H04B 10/08; H04J 14/08
(52) U.S. Cl. .......................... 398/16; 398/100
(58) Field of Search .................... 359/110, 135, 359/137; 370/358, 217, 409, 221, 225, 227, 228; 398/9, 16, 17, 98, 100

(56) References Cited

U.S. PATENT DOCUMENTS

| | | | |
|---|---|---|---|
| 5,229,875 A | | 7/1993 | Glista |
| 5,283,871 A | | 2/1994 | Kobayashi |
| 5,452,306 A | | 9/1995 | Turudic et al. |
| 5,455,832 A | * | 10/1995 | Bowmaster ............. 371/20.1 |
| 5,757,793 A | * | 5/1998 | Read et al. ............. 370/216 |
| 5,841,759 A | * | 11/1998 | Russ et al. ............. 370/221 |
| 5,870,212 A | * | 2/1999 | Nathan et al. ............. 359/119 |
| 5,901,136 A | * | 5/1999 | Lovelace et al. ............. 370/217 |
| 5,978,113 A | * | 11/1999 | Kight ............. 359/110 |
| 5,996,010 A | * | 11/1999 | Leong et al. ............. 709/223 |
| 6,005,694 A | * | 12/1999 | Liu ............. 359/110 |
| 6,018,567 A | * | 1/2000 | Dulman ............. 379/34 |
| 6,072,611 A | * | 6/2000 | Hansen et al. ............. 359/119 |
| 6,285,475 B1 | * | 9/2001 | Fee ............. 359/110 |

FOREIGN PATENT DOCUMENTS

| | | |
|---|---|---|
| JP | 4365241 | 12/1992 |
| JP | 6037760 | 2/1994 |

* cited by examiner

*Primary Examiner*—Leslie Pascal
*Assistant Examiner*—Dalzid Singh

(57) ABSTRACT

A method and system provide alternative communication paths utilizing overhead channels available on the communication network to permit isolated offices to have access to a data network and hence a remotely located monitor/controller via an office that has direct access to such a data network. In addition, the system permits an arrangement of subnetworks which allows a first subnetwork to act as a back-up or redundant path for obtaining alarm and status information regarding a second subnetwork via overhead channels available on the communication path in the first subnetwork.

7 Claims, 7 Drawing Sheets

REMOTE DATA NETWORK ACCESS IN A COMMUNICATION NETWORK UTILIZING OVERHEAD CHANNELS

BACKGROUND

The present invention is directed to a method and apparatus for providing access to a data network. More particularly, the present invention is directed to a method and apparatus by which elements in a first communication network that have no direct access to a data network can be provided with such access via overhead channels employed in the first communication network.

It is known in the communication network environment to provide remote management elements which can monitor and control aspects of the communication network. One example of such a communications network arrangement is an optical fiber network referred to as the Synchronous Optical Network (SONET). In this network an operation support system can remotely monitor network element equipment. As an example, in SONET an optical line system end terminal or repeater equipment, such as that provided by Lucent Technologies, and large capacity terminal equipment, also available from Lucent, both have a port available to provide alarm and status information to an operation support system. This port is referred to as the X.25 Telemetry Port. An example of an operation support system is the Element Management Controller-2000 (EMC-2000) developed by AT&T/NCS (Network and Computing Service Division).

FIG. 1 provides a block diagram representation of an arrangement employing such a remote monitor and controller with communication network elements. In FIG. 1 the communications network includes such elements as communication stations 101 and 102. Of course, the communications network would in all likelihood consist of multiple stations beyond those shown in FIG. 1. A station could be a central office (CO) in a communication network. Each station would include terminal equipment (e.g., 1031 and 1032) referred to in a specific example as an optical line system end terminal. The stations are linked together via optical fiber links 104. To compensate for the distance limitations which arise in terms of transmitting information over the optical fibers, repeater elements 105 may also be employed in the network interconnecting the communication stations 101 and 102. Each of the communication stations may also include a network interface device 1071 and 1072. Such an interface device provides direct connection to a data network 110. The data network provides access from the communication network to a remote monitor and controller device 115. As each communication station may include multiple optical line system end terminals and multiple large capacity terminals, data switches 1061 and 1062 are included to concentrate the multiple X.25 Telemetry Ports on the various pieces of equipment to provide a single connection to the network interface.

In one example deployment each large capacity terminal and optical line system end terminal included in a communication station such as 101 has a port for communicating alarm and status information. In the example this is the X.25 Telemetry Port and that port is connected to a switch (in the example an X.25 switch) co-located in the station or central office. The X.25 Telemetry Ports are then connected to the network interface via the switch. The network interface provides connectivity to a network such as AT&T's Dedicated Wide Area Network (DWAN). The operation support system, that is the remote monitor and controller 115, is located at a centralized operation center and can access the X.25 Telemetry Ports over the data network.

Data network connectivity to the X.25 switch at each central office or station is provided internally by AT&T or leased from a local exchange carrier depending on circuit availability and bandwidth needs.

In one proposed architecture, the EMC-2000 receives most of its data through a SONET node that is designated as a gateway network element. For example, on a typical SONET ring two nodes would be gateway network elements, one the primary element, the other an alternate to provide redundancy. All optical line systems that are part of this ring utilize the SONET data communication channel to communicate alarm and status information to the EMC-2000 via the gateway network element. These gateway network elements are always located in offices that have network access. In order for the controller 115 to obtain optical line system performance monitoring data, however, it must have access to the data port, the X.25 Telemetry Port, on each optical line system end terminal.

The inventors have determined that as deployment progresses the topologies of some of the SONET rings have forced some of the optical line system end terminals to be physically located in offices that do not have network access. For example, certain offices or stations may be remotely located or placed in isolated areas. These isolated areas typically are not provided with direct access to the data network. Nonetheless, these offices require access, via a port, to the data network so as to supply to the controller information on behalf of the optical line system elements and the large capacity terminals associated with that end terminal. Known system configurations do not provide any paths for such isolated office operations.

SUMMARY OF THE INVENTION

The present invention provides a new system arrangement and method by which a remotely located or isolated office related to an end terminal needing data network access is provided with access via a network interface associated with another optical line system end terminal. In particular, in accordance with an embodiment of the present invention, the system employs overhead channels available on the communication network to provide an alternate path from the isolated optical line system to an optical line system end terminal that has direct access to the data network. Hence the isolated optical line system can exchange information with a remote monitor and controller.

In a further embodiment of the present invention a network is arranged so as to provide multiple subnetworks. Overhead channels which are available in the communication network can be employed so as to provide a redundant reporting path relating to the subnetworks. More particularly, given a first subnetwork and a second subnetwork which both have a physical appearance in the same station or central office, the second subnetwork can be utilized as an accessing vehicle for obtaining alarm and status information regarding the first subnetwork over overhead channels available on the second subnetwork. Alternatively, the first subnetwork can operate as a redundant or back-up path for providing status and alarm information relating to the second subnetwork utilizing overhead communication channels available on the first subnetwork.

In a more specific embodiment the arrangement uses one or more order wire channels available in the overhead channels.

Further advantages of the present invention will be described below in connection with the detailed description of the invention.

DETAILED DESCRIPTION

Figure 1:
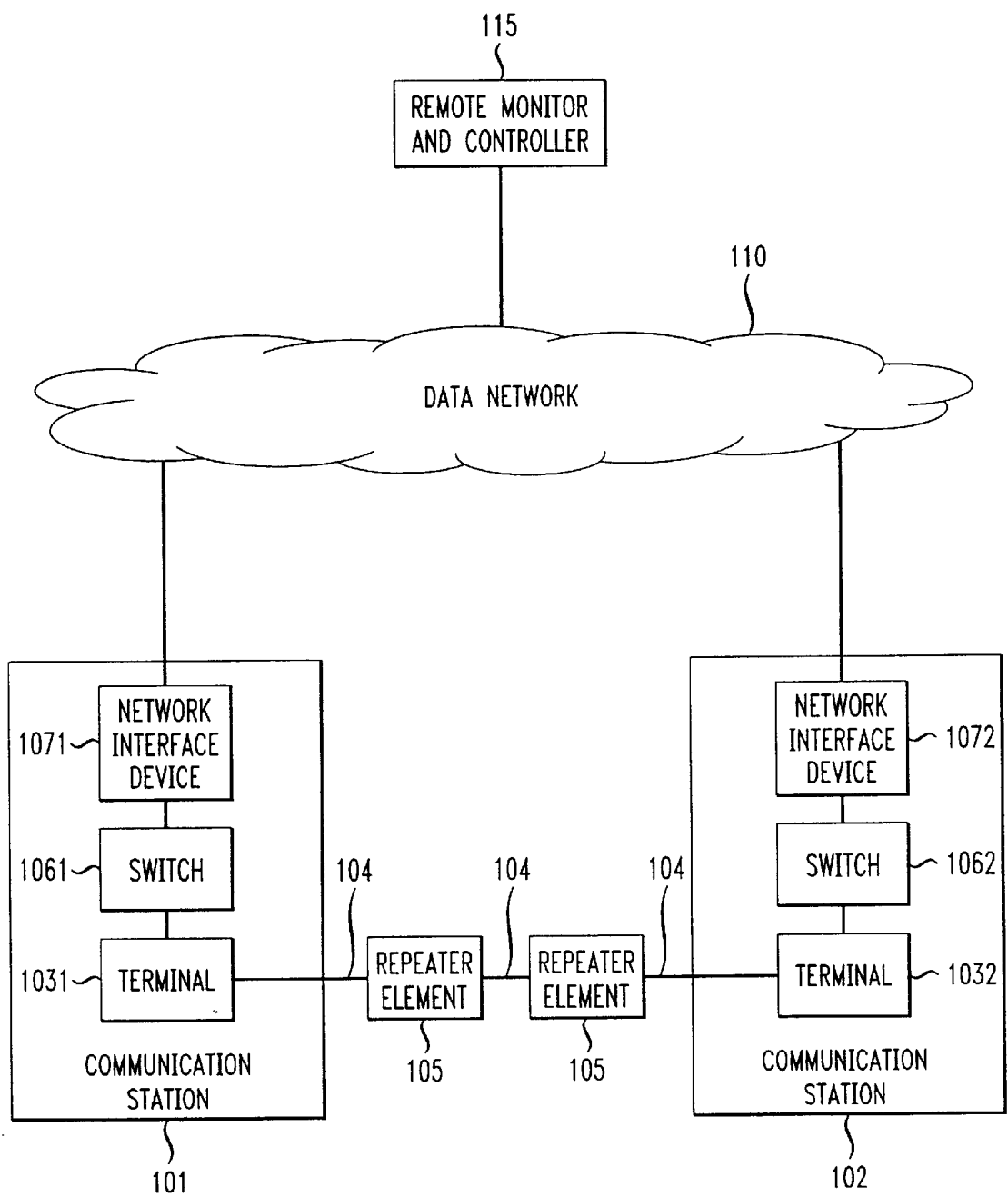
FIG. 1 illustrates a known communications network arrangement.
Figure 2:
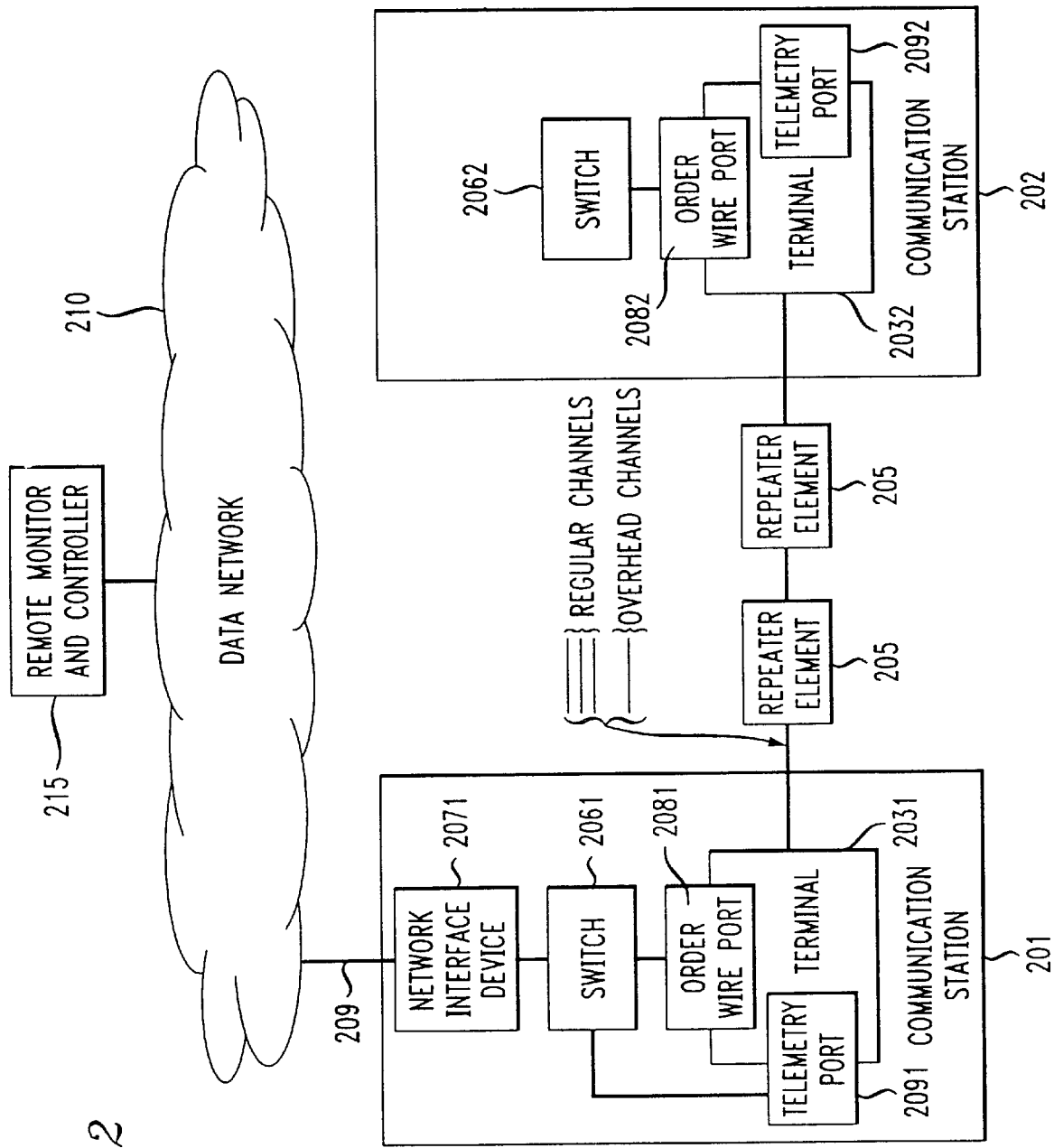
FIG. 2 illustrates a block diagram representation of a first embodiment of the present invention.

In accordance with an embodiment of the present invention a communication station that is either remotely located or isolated with no direct access to a data network can be provided with an alternative path to the data network and hence a remote monitor and controller utilizing other available channels in the communication network. More particularly, the present invention employs a connection via overhead channels available in the communication network so as to provide an alternative path from the isolated communications station to an alternative communication station that is connected to the data network. An example of such an embodiment is illustrated in FIG. 2 where two communication stations, 201 and 202 of the communication network are shown. These stations can be central offices (COs) in a communication network. Naturally, many more communication stations may be available in the network. In this arrangement communication station 201 has a connection to a data network 210 via a direct connection 209. Communication station 202 has no such connection to the data network. Nonetheless, the communication station 202 may be interested in conveying status and/or alarm information to the remote monitor and controller 215 which is coupled to the data network. In the illustrated embodiment both of the communication stations include terminal elements (2031 and 2032) as well as switches 2061 and 2062. The two terminal elements 2031 and 2032 are coupled via a multichannel communication path that can include one or more repeaters 205. The multichannel communication path includes a plurality of regular channels and a plurality of overhead channels. This notion is represented in FIG. 2. It should be noted, however, that the illustrated lines representing the channels are not meant to require that each channel have its own line. In fact, multiple channels are to be provided over a single medium, such as an optical fiber. The diagram is simply to aid in conceptualizing the fact that there are multiple communication channels coupling the two end terminals. The terminal elements have X.25 Telemetry Ports (2091 and 2092 respectively) for normal data flow. Only one network interface, 2071 is illustrated since only the station 201 has a connection to the data network 210. The connection from the switch 2062 in the second station, which is isolated, through to the network interface 2071 is provided via overhead channels available in the communication network between the terminal 2032 and the terminal 2031.

The details of an application of this invention to a known optical network will now be described.

Figure 6:
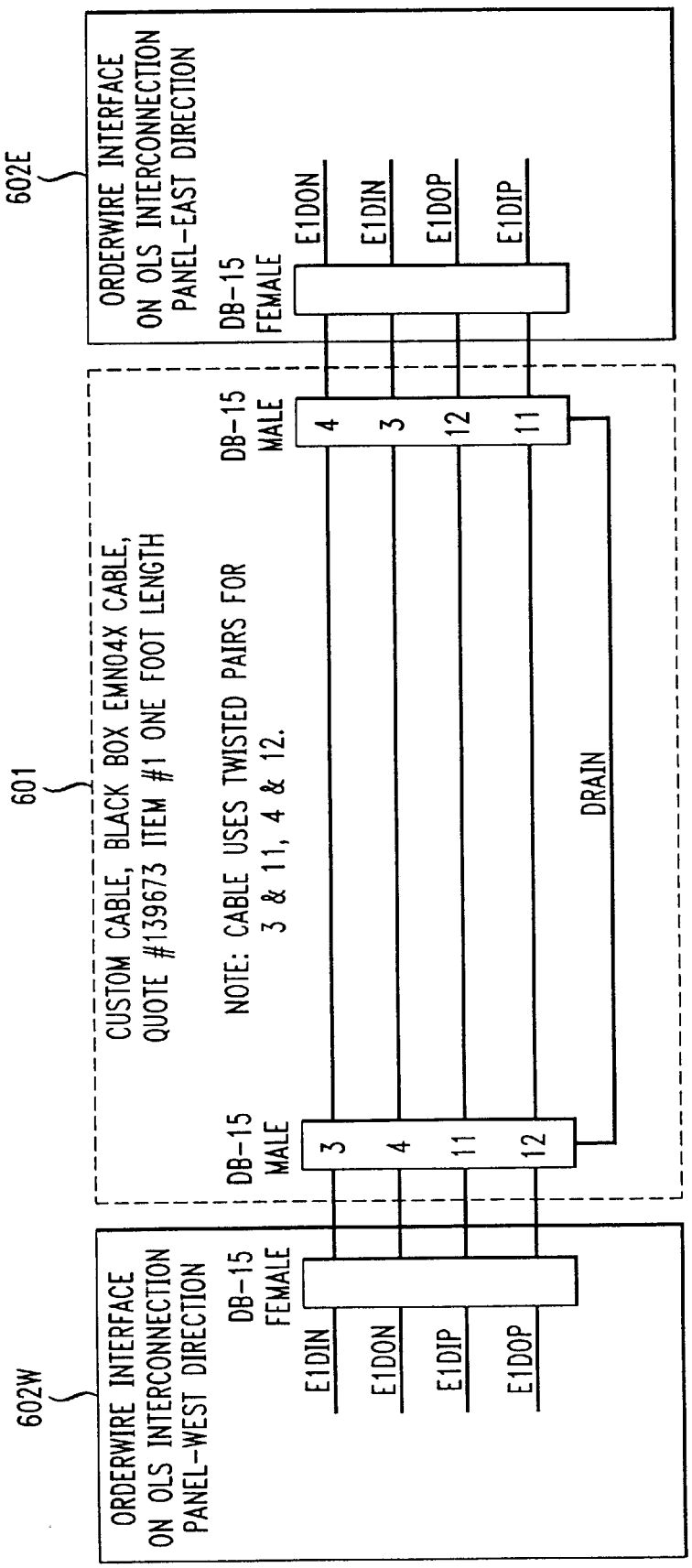
FIG. 6 illustrates an example of a connection arrangement which can be utilized in either the first or second embodiment of the present invention.
Figure 7:
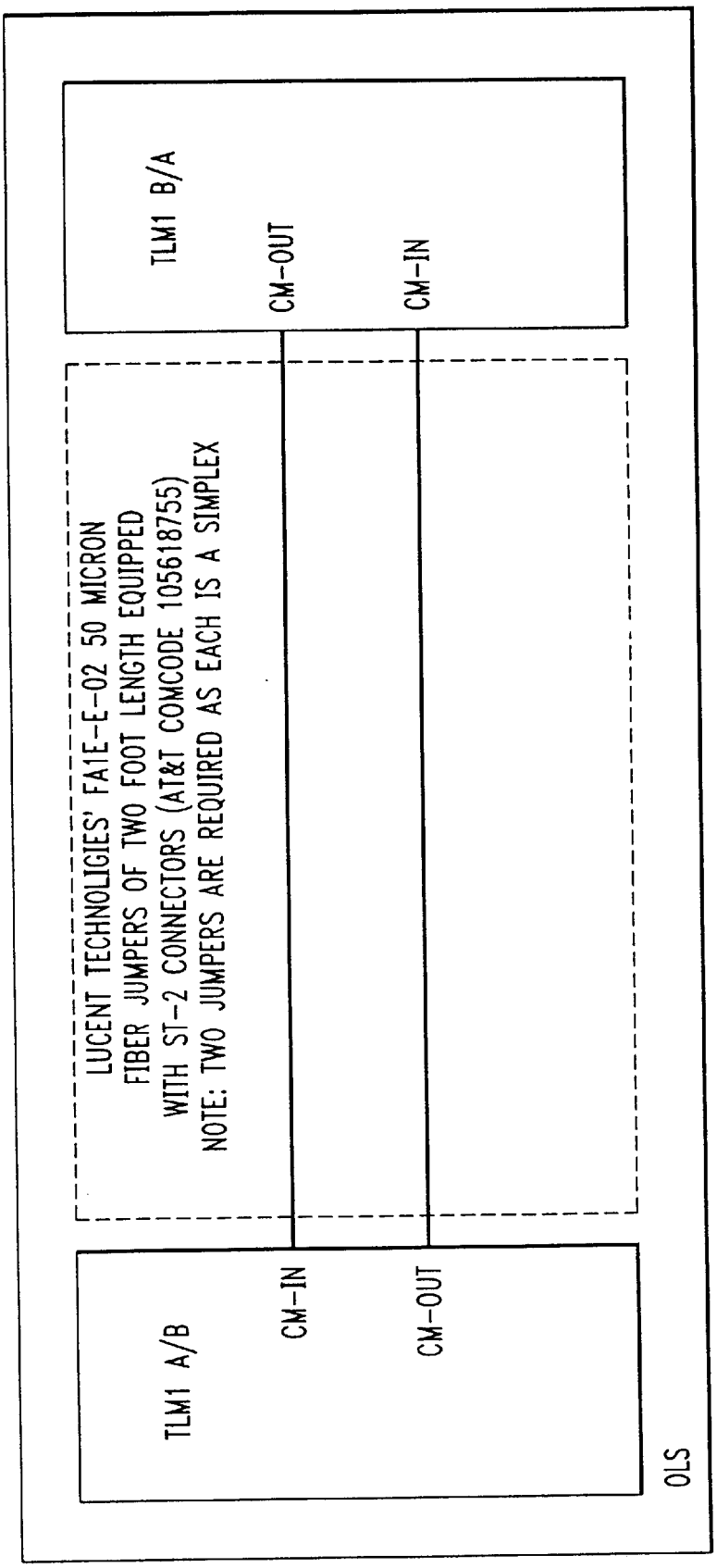
FIG. 7 illustrates an example of a fiber jumper connection that can be utilized in connection with the present invention.

In the example the switches 2061 and 2062 can be Telematics X.25 switches. An available RS-232 port on the switch in both the office that has network connectivity (201) and the office that requires it (202) are connected via an over head channel, in this case a synchronous order wire available on the optical line system end terminal in the respective stations. In the example deployment each optical line system end terminal (2031, 2032) has an order wire port (2081, 2082) that provides an RS-422 interface. As a consequence there must be an interface converter (not shown) between the RS-232 port of the Telematic switch and the RS-422 interface of the optical line system end terminal (e.g., 2031 or 2032). For the order wire channel to be connected from office to office the optical line system repeater equipment located at each repeater site in between (if any), for example 205 needs to have an order wire patched through as the orderwire channels are not expressed through these repeaters. An example of how to patch the orderwire data through a repeater site is shown in FIGS. 6 and 7. A custom cable 601 is shown connecting orderwire interfaces of the East and West direction (602E and 602W respectively) on the OLS Interconnection Panel. The cable connects the negative data input (E1DIN) of the West Directed Interface (602W) with the negative data output (E1DON) of the East Directed Interface (602E). Also the cable connects E1DON of 602W and E1DIN of 602E. The cable further connects the positive data input (E1DIP) of 602W with the positive data output (E1DOP) of 602E. E1DOP is 602W is coupled to E1DIP of 602E. In the nomenclature the signals E1DIN, E1DON, E1DIP, E1DOP can be represented by E1XYZ where E1 refers to the E1 Section Overhead Byte, X=D stands for Data, Y=I stands for input, Y=O stands for output, Z=P stands for Positive, and Z=N stands for Negative.

It is also anticipated that since at the repeater sites the orderwires on each side of the repeater are independent multimode fiber jumpers must be used to bridge the customer maintenance channel to ensure that order wire clock signals on both sides (i.e., the east and west domains) of the optical line system are derived from the same oscillator. An example of such a fiberjumper connection is shown in FIG. 7. Here the clock in (CM-IN) of one side is coupled to the clock out (CM-OUT) of the other side. This bridging using multimode fiber jumpers is necessary as the transmit and receive clocks on the order wire ports are both strictly outputs, that is the transmit clock on one order wire port cannot be connected to the receive clock on another order wire port. Therefore, to pass data from one order wire port to another synchronously, and without errors caused by phase and frequency differences between two independent clocks, the order wire clocks must be derived from the same source.

The arrangement of the present invention, utilizing for example, an order wire channel from among the overhead channels available in the communication network, daisy chains the two switches thus allowing one switch, 2062, to receive/send traffic to the data network indirectly via the other switch 2061. Logically, the switch in the central office or communication station that has network access needs to be configured to direct any incoming calls intended for the other office to that port to which the order wire is connected. Similarly, the switch in the central office that is isolated and needs the indirect path is required to be configured to direct outgoing calls intended for a data network to the order wire port of the optical line system for transmission, via the overhead channels, to the central office that has direct access.

In the network example, at the X.25 physical layer (level 1) the X.25 switch ports must provide a DTE interface. At the link layer (level 2) and the packet layer (level 3), one switch must have its port set to DTE and the other switch must have its port set to DCE. Furthermore, both switches must have their order wire ports set for external sync as clocking is provided by the optical line system order wire port at 64 kbps synchronous. In one embodiment of the communication network the Telematics X.25 switch is deployed with an octal DMA II. communication adapter module that is capable of strobing data into and out of its interface circuitry using the independent transmit and receive clock signals that are provided by the orderwire at a rate of 64000 bits per second.

In a network referred to as the next generation lightwave network, (NGLN) on the end terminal interconnect panels active order wire ports are the XA or YA section order wire, section user channel and line order wire ports. In the nomenclature referred to above, the section overhead orderwire byte is E1, the Section User channel byte is F1, and the line overhead orderwire byte is E2. For NGLN, X is the working or active fiber (that is line 1), and y is the protection fiber (that is line 2). The protection fiber, typically provided for redundancy purposes, thus includes overhead channels that can be employed even when not carrying any user traffic. Therefore, each end terminal has six available order wire ports (i.e., three on the working fiber and three on the protection fiber). The optical line system repeaters have a total of twelve available order wire ports (i.e., six in the east direction and six in the west direction). Note that the order wires on the working and protection fiber are independent, that is if the working fiber fails the order wire channels do not get switched to the protection fiber.

Having identified the available order wires it is possible to select among those order wires to provide the alternative connection for the isolated switch. Therefore, it is contemplated that in accordance with an embodiment of the present invention, it would be possible to use either the line order wire available on either the working or protection fibers, the section user channel available on either the working or protection fibers or the section order wire available on the working or protection fibers or some combination.

Figure 4:
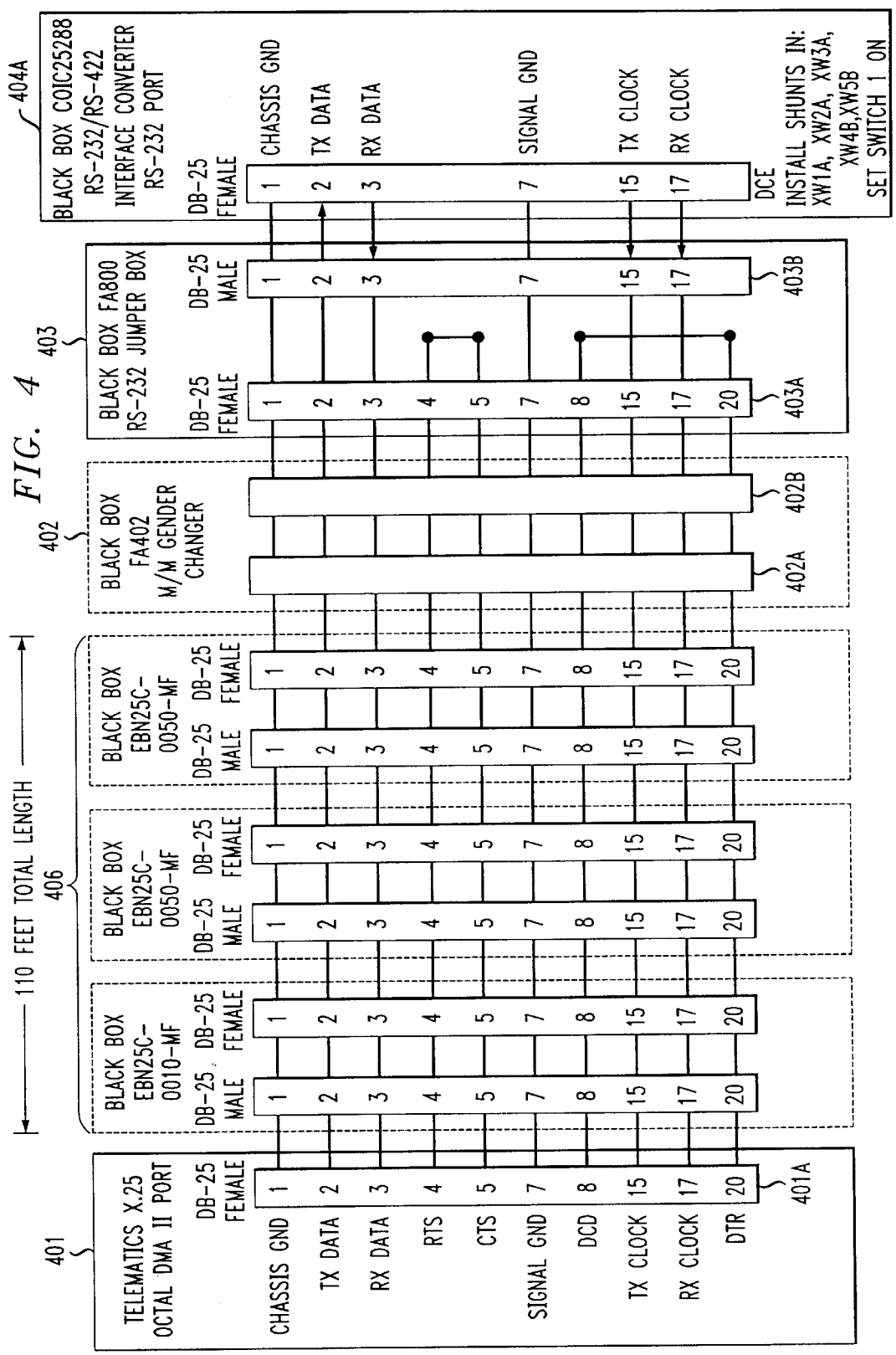
FIG. 4 illustrates an embodiment of a connector arrangement which can be utilized in either of the first or the second embodiment of the present invention.
Figure 5:
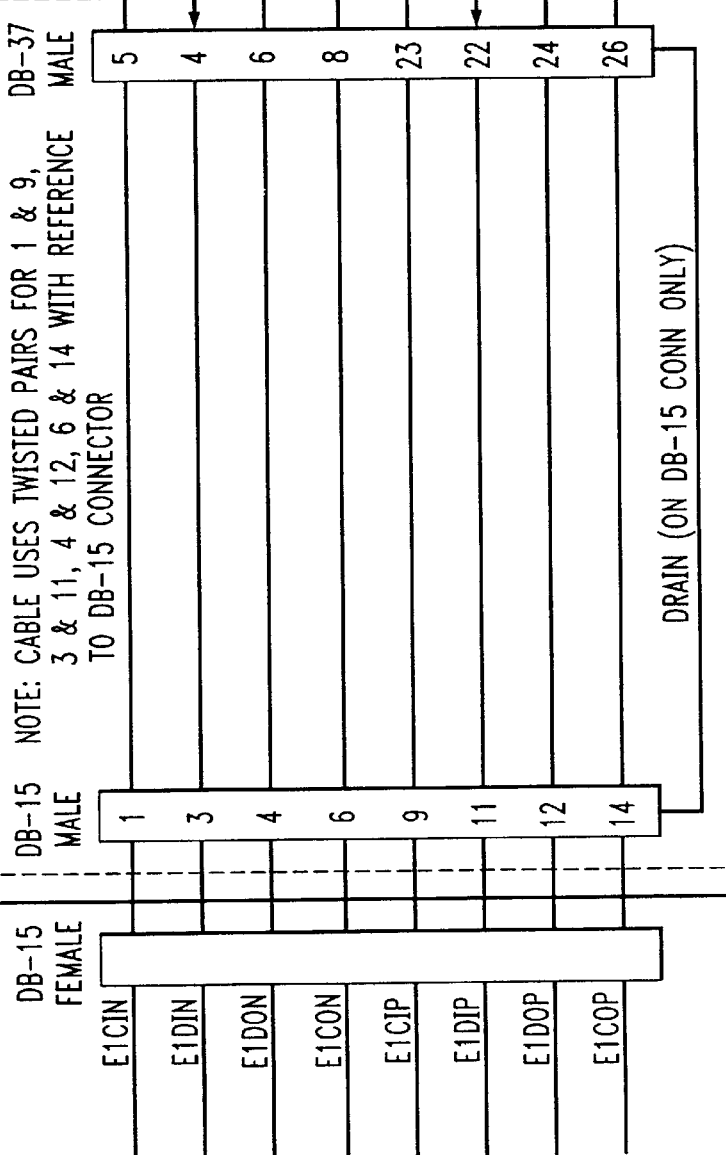
FIG. 5 illustrates an example of a second connector arrangement which can be utilized in either the first or second embodiment of the present invention.

Examples of cable interfaces which could be utilized in the above described example communication system are illustrated in FIGS. 4 and 5 of the present application. For example, FIG. 4 illustrates one possible embodiment of a connection between an RS-232 port of a Telematics switch and an RS-232/RS-422 converter. The switch is shown as element 401 and is provided with an output plug 401A which is a female plug including lines related to: the chassis ground; the transmit data; receive data; RTS; CTS; signal ground; DCD; transmit clock; received clock; and DTR. A first cable 406, having a length that can be at least 110 feet, is coupled at a first end of the cable to the female plug of the switch 401. A first connection element 402 is coupled to a second end of cable 406 and provides a female to male conversion of the plug, that is the device provides a male plug 402A for connection to the female plug of the switch and then provides a male plug 402B for connection to a second connecting device 403 which is an RS-232 jumper box. As is shown in the illustrated example the jumper box 403 can provide connections between the RTS and the CTS lines as well as between the DCD and DTR lines, in order to keep the flow control signals to the switch always active as the order wire channels do not provide flow control. Then the female plug 403A which connects to the first cable connector 402 is also connected to a male plug 403B that provides output connections to the RS-232/RS-422 interface converter at the RS-232 port of the converter. The converter thus takes forward the chassis ground, the transmit data, the receive data, the signal ground, the transmit clock and receive clock lines.

FIG. 5 illustrates an example of a connection of the order wire port of the optical line system to the RS-422 port of the RS-232/RS-422 converter thereby providing access from the switch to the order wire port of the optical line system. FIG. 5 shows the RS-422 port of the converter, 404B which includes the following lines: send timing (−A); send data (−A); receive data (−A); receive timing (−A); send timing (+B); send data (+B); receive data (+B); receive timing (+B). These are all provided to a female plug which is provided to a female to male converter plug cable configuration which can be a custom cable as shown in FIG. 5 as element 504. The signal directions of the various lines are shown using arrows on the signal lines. This provides a male plug output to the female plug of the order wire interface on the optical line system interconnection panel 505.

The example embodiment utilizes the Lucent Technologies Optical Line System orderwire port 505 shown in FIG. 5. Note that this particular orderwire port provides an electrical data circuit terminating equipment (DCE) interface that meets the EIA Standard RS-422-A specification. In addition, the orderwire port functions synchronously, providing both transmit clock and receive clock. These clocks are independent 64000 Hz square waves. The transmit clock is used to strobe the transmit data into the orderwire port and the receive clock is used to strobe the receive data out of the orderwire port. In this example, the transmit data is provided by the switch 401 via the interface converter 404 A/B and the receive data is sent to the switch 401 via the interface converter 404 A/B. For AT&T's NGLN deployment, the transmit clock is provided by a locally generated clock reference, while the receive clock is derived from the incoming customer maintenance channel.

In accordance with the disclosed embodiment of the invention as described in connection with a specific network deployment, a first communication station 202 which is otherwise isolated from the data network can be provided with an indirect path to the data network via overhead channels, such as order wire lines, available in the communication network whereby a connection is provided to an end terminal that does have direct access to the data network.

In the above examples the overhead channels used have been referred to as orderwire ports. The specific channels referred to (line order wire, section order wire and section user channels) are available in the Lucent implementation of SONET. The SONET standard itself divides the overhead usage into required and optional. Other equipment vendors may implement other portions of the optional overhead in addition to or instead of that implemented by Lucent. The present invention can be implemented by utilizing one of these other overhead channels rather than the specific channels identified with reference to the Lucent equipment.

Figure 3:
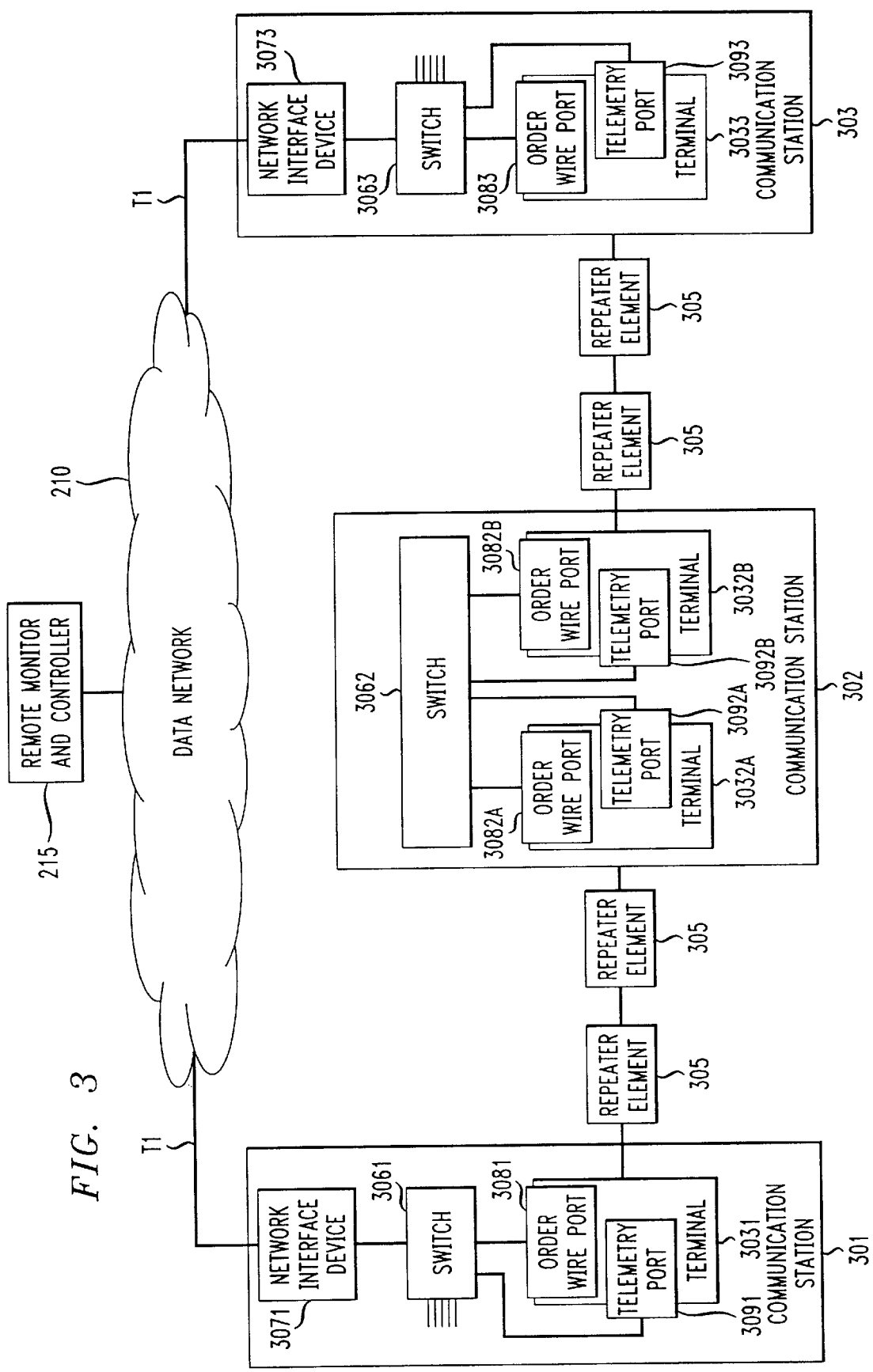
FIG. 3 illustrates a block diagram representation of a second embodiment of the present invention.

In accordance with a further embodiment of the present invention the use of the overhead channels can be extended so as to provide redundant paths for access to various subnetworks of the communication network so as to guarantee access to the remote monitor and controller. An arrangement in accordance with this further embodiment is illustrated in FIG. 3. The communication network is shown with three of possibly many communication stations, 301, 302 and 303. A first subnetwork of the communication network can comprise the connection of terminal 3031 to terminal 3032A. A second subnetwork of the communication network can comprise the arrangement between terminal 3032B and terminal 3033. As can be seen, communication station 302 including terminals 3032A and 3032B also includes a switch such as the Telematics X.25 switch described above. There are other vendors that also support X.25 switching, such as the CISCO, which has the 3620 router that can support the level of X.25 switching required. This switch does not, however, have direct access to a data network 310 and in turn does not have direct access via such a network to a remote monitor and controller 315. Using a connection consistent with the embodiment of FIG. 2 the switch 3062 does have an alternative path to the data network via network interface 3071 in the first communication station 301. This can be arranged as described above via overhead channels such as provided using the order wire ports of terminals 3031 and 3032A, 3081 and 3082A respectively. In addition switch 3062 may have yet another alternative path to the data network via network interface 3073 via an overhead channel supplied in the second subnetwork that includes terminals 3032B and 3033 using ports 3082B and 3083. Thus, switch 3062 has alternative paths to the data network via either one of the two subnetworks using overhead channel connections such as connections to order wire ports as described above.

In this embodiment not only does the switch 3062 have an alternative path for its indirect access to the data network, but the arrangement provides redundant or back-up connection with regard to the monitoring of either one of the two subnetworks.

For example, the direct connection to network interface 3071 provides the primary access of the data network, and more specifically the remote monitor and controller 315, to a first subnetwork that includes terminals 3031 and 3032A and any in between repeaters 305. Alternatively, given the arrangement of the present invention a back-up or redundant connection to the first subnetwork can be provided via the second subnetwork. In particular, the remote monitor and controller 315 is connected via the data network to the network interface 3073. That interface is then connected to switch 3063 which, via the overhead channel connections described above, (using for example the orderwire ports 3083 and 3082B) provides an indirect path to switch 3062 in the second communication station. Once this connection is provided then, the switch 3062 can be an access point to the first subnetwork via the X.25 Telemetry Port (3092A) for the remote monitor and controller since one of the end points, 3032A, is coupled to the switch 3062.

In a more specific example of this arrangement of that subnetwork, the terminals 301 and 303 may be provided with connections to the data network 310 via T1 connections. The network interfaces in their respect stations can be constituted by DSUs and the switches 3061 and 3063 may be Telematics X.25 switches which can have multiple X.25 Telemetry Ports connected to various optical line system devices or terminals, for example 3031 and 3033 respectively. Furthermore, the terminals 3031 and 3032A can be connected utilizing optical amplifier sites or repeaters such as 305. The second communication station 302 may also include a Telematics switch as switch 3062 and that switch is coupled to both terminal devices 3032A and 3032B via X.25 Telemetry Ports (3092A and 3092B) and via order wire ports (3082A and 3082B) which can both be optical line system elements that are end terminals of respective subnetworks. The overhead channels which may be utilized in connection with providing the alternative access to switch 3062 via either one of the two subnetworks can again be the available order wire channels in the communications network.

In accordance with the present invention, overhead channels provided in the communication network, such as order wire channels, enable alternative and indirect access to remote or isolated switches in a communication network whereby a remote monitor/controller can still receive status and alarm information from network elements without need for direct connection to the isolated switch.

What is claimed is:

1. A method for transmitting communication network status information to a network controller via a data network, the method comprising the steps of:

generating a status signal at a first communication node of a network-isolated optical network element;

forwarding said status signal to a second communication node of a network interfaced network element via an overhead channel path;

transmitting said status signal from said second communication node to the network controller via a network interface; and wherein said step of forwarding comprises the substeps of:

forwarding the status signal to an orderwire port of the first communication node; and transmitting the forwarded status signal from the orderwire port of the first communication network node to an orderwire port of the second communication node.

2. An optical communication network comprising:

a first optical node including,
   a data switch,
   an optical line system end terminal coupled to said data switch, and
   a data network interface coupled to said data switch, a second optical node including,
   a second data switch,
   an optical line system end termninal, and
   an orderwire port adapted to receive an outgoing call from said second data switch; and an orderwire patch path coupling an orderwire channel of the optical line system end terminal of said first optical n ode with an orderwire channel of the optical line system end termninal of said second optical node.

3. An optical communication network comprising:

a first network node including,
   a first data switch,
   a first data network interface coupled to said first data switch, and
   a first optical line system network element having an orderwire port coupled to said first data switch;

a second network node including,
   a second data switch,
   a second optical line system network element having an orderwire port coupled to said second data switch and to said orderwire port of said first optical line system network element;

a third optical line system network element having an orderwire port coupled to said second data switch; and a third network node including,
   a fourth optical line system network element having an orderwire port coupled to said orderwire port of said third optical line system network element, wherein said first and second optical line system network elements constitute terminal points of a first sub-network, and said third and fourth optical line system network elements constitute terminal points of a second sub-network.

4. In an optical communication network comprising, a first network node including,
   a first data network interface,
   a first data switch coupled to said first data network interface;
   a first end terminal of a first optical line system having an orderwire port coupled to said first data switch;

a second network node including,
   a second data switch,
   a second end terminal of said first optical line system having an orderwire port coupled to said second data switch and to said orderwire port of said first end terminal of said first optical line system, and a first end terminal of a second optical line system having an orderwire port coupled to said second data switch a third network node including,
   a second data network interface,
   a third data switch coupled to said second data network interface,
   a second end terminal of said second optical line system having an orderwire port coupled to said orderwire port of said first end terminal of said second optical line system and to said third data switch, said first and second end terminals of said first optical line system constituting terminal points of a first sub-network, and said first and second end terminals of said second optical line system constituting terminal points of a second sub-network, a method for monitoring the first and second sub-networks, the method comprising the steps of:

in a primary mode,
   coupling the first data network interface to a controller; and
   transmitting status information regarding said first sub-network to said controller via said first data network interface; and in a secondary mode,
   coupling the second data network interface to a controller, and
   transmitting status information regarding said first subnetwork to the controller coupled to said second data network interface via said second subnetwork.

5. The method of claim 4 wherein said controller coupled to said first data network interface is the same as the controller coupled to said second data network interface.

6. The method of claim 4 wherein the transmitted status information flows to a given data network interface via orderwire ports on at least one of the subnetworks.

7. The method of claim 4 wherein said second network node transmits information to a data network controller via either said first subnetwork or said second subnetwork.

* * * * *